(12) United States Patent
Hoopman

(10) Patent No.: US 8,201,865 B2
(45) Date of Patent: Jun. 19, 2012

(54) PIPE GRIPPER DEVICE FOR PULLING PIPE AND METHODS OF USE

(76) Inventor: Timothy L. Hoopman, River Ralls, WI (US)

( * ) Notice: Subject to any disclaimer, the term of this patent is extended or adjusted under 35 U.S.C. 154(b) by 423 days.

(21) Appl. No.: 12/650,186

(22) Filed: Dec. 30, 2009

(65) Prior Publication Data
US 2010/0202837 A1 Aug. 12, 2010

Related U.S. Application Data

(60) Provisional application No. 61/150,828, filed on Feb. 9, 2009.

(51) Int. Cl.
*B66C 1/54* (2006.01)
(52) U.S. Cl. .............. 294/95; 294/97; 294/902
(58) Field of Classification Search ............ 294/95, 294/97, 86.24, 86.25, 96, 902
See application file for complete search history.

(56) References Cited

U.S. PATENT DOCUMENTS

| | | | | |
|---|---|---|---|---|
| 1,851,116 A | * | 3/1932 | Spiro | 294/95 |
| 3,654,686 A | * | 4/1972 | McFarland et al. | 29/280 |
| 3,709,546 A | | 1/1973 | Vaughan | |
| 4,576,407 A | * | 3/1986 | Lambert | 294/97 |
| 4,746,158 A | | 5/1988 | Fields | |
| 5,094,496 A | | 3/1992 | King, Sr. | |
| 5,597,192 A | | 1/1997 | Smith | |
| 5,647,627 A | | 7/1997 | Baessler | |
| 5,988,719 A | | 11/1999 | Lavender | |
| 6,615,919 B2 | | 9/2003 | Osgood et al. | |
| 7,232,167 B2 | | 6/2007 | Edwards | |
| 7,396,060 B2 | | 7/2008 | Huncovsky | |
| 2008/0197646 A1 | | 8/2008 | Anda | |

FOREIGN PATENT DOCUMENTS

DE 4126600 A1 2/1993

* cited by examiner

*Primary Examiner* — Saul Rodriguez
*Assistant Examiner* — Gabriela Puig
(74) *Attorney, Agent, or Firm* — Dicke, Billig & Czaja, PLLC

(57) ABSTRACT

A pipe gripper device including first and second gripper bodies and a clevis assembly. The gripper bodies each have a head and an arm. The head forms a slot. The arm defines a grip segment proximate a leading end and forms a textured exterior surface. The arms are pivotably coupled and slidably contact one another along corresponding interiors. The clevis assembly includes a clevis mounted to the heads by a pin passing through the respective slots. The gripper device is transitionable between a contracted state and an expanded state by pivoting of the gripper bodies at the corresponding pivot points, with the pin sliding within the slots to define a limit of the expanded state. In the contracted state, the grip segments are readily inserted into a pipe; upon transitioning toward the expanded state, the grip segments engage the pipe interior for application of a pulling force.

20 Claims, 15 Drawing Sheets

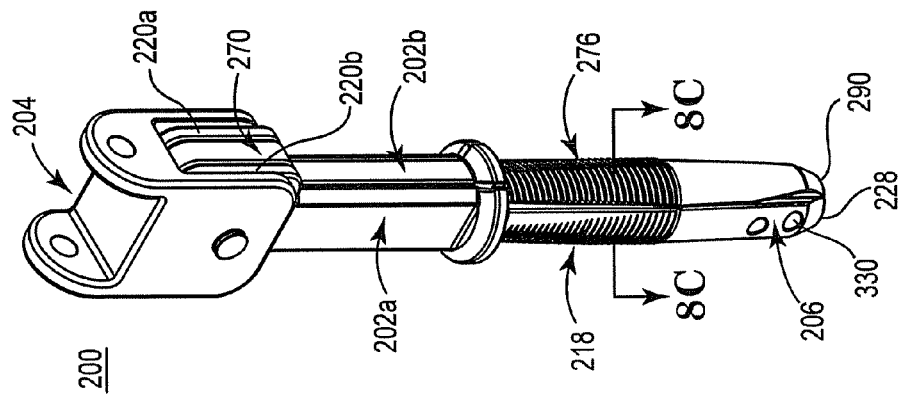
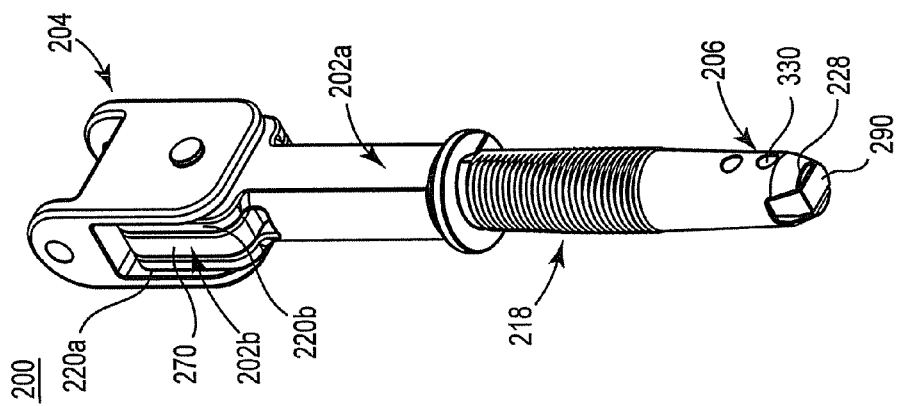
Fig. 8B
Fig. 8A

PIPE GRIPPER DEVICE FOR PULLING PIPE AND METHODS OF USE

CROSS-REFERENCE TO RELATED APPLICATIONS

This application claims priority under 35 U.S.C. §119(e)(1) to U.S. Provisional Patent Application Ser. No. 61/150,828, filed Feb. 9, 2009, entitled "Pipe Gripper Device for Pulling Pipe, Such as Vertical Dewatering Site Pipes, and Methods of Use", and the entire teachings of which are incorporated herein by reference.

BACKGROUND

The present disclosure relates to devices or tools for engaging conduits or pipes. More particularly, it relates to pipe gripper tools or devices that assist workers in pulling pipes, such as when removing or pulling vertically oriented pipes.

The need to positively engage an end of a pipe arises under many circumstances. For example, installation of underground utility lines (e.g., water, sewer, gas, electrical, communications, etc.) oftentimes requires dewatering the site prior to placement of the lines. One conventional dewatering approach entails vertically inserting or boring a series of elongated plastic or metal tubes or pipes into the ground at spaced locations. The vertically oriented pipes are then fluidly connected to a larger, above ground manifold. A pump draws underground water through the pipes and manifold. Once the installation site is sufficiently dry, the pipes must be removed. Because a vast majority of the pipe length is embedded into ground, a fairly significant pulling forces is often required. Further, the pipes are relatively long (on the order of 10-30 feet in length). Large lifting construction equipment, such as a crane or boom mounted winch or backhoe, is typically employed to pull the pipes from the ground.

Conventionally, a chain is connected between the pipe and the lifting machinery (e.g., a winch hook). In particular, the chain is wrapped about the pipe's exterior at an exposed end thereof, and then mounted to the winch hook. While viable, attachment and removal of the chain relative to the pipe is time consuming, and the chain may overtly tighten against the pipe, leading to failure/breakage. Conversely, the chain may inadvertently slip off of the pipe end during the pulling process, requiring the worker to waste time re-connecting. Further, because the chain/pipe end connection point is typically high in the air following completion of the pulling efforts (e.g., 10-30 feet above ground), workers are unable to quickly disconnect the pipe from the chain. Instead, the lifting machinery must be lowered until the chain is within arm's reach. With longer pipe lengths, this is a time-consuming process, and requires a relatively large open area to complete. Perhaps more problematic, the chain may unexpectedly release from the pipe while the pipe is raised high above ground; under these circumstances, the pipe will fall to the ground, endangering any workers in the vicinity.

Though not necessarily intended for vertical pulling of dewatering pipes, efforts have been made to develop a pipe-gripping tool that engages the inner diameter or surface of a pipe for subsequent application of a pulling force. U.S. Pat. Nos. 7,232,167 and 7,396,060 are but two examples. In general terms, previous pipe-gripping tools initiate contact of tool-provided gripping surfaces with the interior surface of the pipe, with the amount of force applied to that interior surface being defined or dictated by a separate, self-contained mechanism of the tool. The gripping force is sustained by the mechanism in and of itself, and is independent of the orientation of the pipe and the separate force applying machine (i.e., the pipe and the force applicator can be vertical, horizontal, upside down, etc.), rendering user connection and subsequent release of the tool to and from the pipe's interior to be a time consuming process. The tension applied to the tool has little, if any, effect on the force on the interior surface of the pipe. While potentially viable, these prior pipe-gripping tools are not optimally configured to satisfy the constraints associated with pulling vertically-oriented pipe, or quick release of the gripping tool from the pipe when the tool/pipe connection point is located at an elevated height, such as with dewatering site pipe removal.

In light of the above, a need exists for an improved pipe gripper device for rapid engagement and disengagement of an inner surface of a pipe for use in pulling the pipe.

SUMMARY

Some aspects of the present disclosure relate to a pipe gripper device for selectively engaging an inner surface of a pipe for use in pulling a pipe. The pipe gripper device includes first and second gripper bodies and a clevis assembly. The gripper bodies each define an exterior and an interior, and include a head and an elongated arm. The head forms a slot. The elongated arm extends from the head and terminates at a leading end opposite the head. In this regard, the arm defines a grip segment proximate the leading end and forms a textured surface along the exterior. The arms are pivotably coupled to one another at a pivot point adjacent the respective leading ends, and slidably contact one another along at least a portion of the corresponding interiors. The clevis assembly includes a clevis mounted to the heads by a pin passing through the respective slots. Upon final assembly, the pipe gripper device is transitionable between a contracted state and an expanded state by pivoting of the gripper bodies relative to one another at the corresponding pivot point, with the pin sliding within the corresponding slots to define a limit of the expanded state. A maximum outer dimension collectively defined by the grip segments in the expanded state is greater than that of the contracted state. In the contracted state, then, the grip segments are readily inserted into a pipe; upon transitioning toward the expanded state, the grip segments then engage the pipe for application of a pulling force. In some optional configurations, the pipe gripper device further includes a hinge assembly providing at least first and second hinge positions, with a maximum outer working dimension collectively defined by the grip segments differing between the hinge positions. With this optional configuration, a user can select the desired hinge position based upon a size (e.g., inner diameter) of the pipe to be pulled.

Yet other aspects of the present disclosure relate to a method of pulling a pipe at least partially disposed underground. The method includes transitioning the pipe gripper device described above to the contracted state. The grip segments are inserted into an end of the pipe, and the pipe gripper device is transitioned toward the expanded state such that the grip segments engage an interior surface of the pipe. A pulling force is applied onto the pipe gripper device, with the pipe gripper device transferring this pulling force onto the pipe so as to effectuate pulling of the pipe from underground. Where desired, the pipe gripper device can be withdrawn from the pipe by, for example, removing the pulling force and transitioning the device toward the contracted state.

BRIEF DESCRIPTION OF THE DRAWINGS

FIGS. 8A and 8B are perspective views of the pipe gripper device of FIG. 5 upon final assembly;

DETAILED DESCRIPTION

Figure 1A:
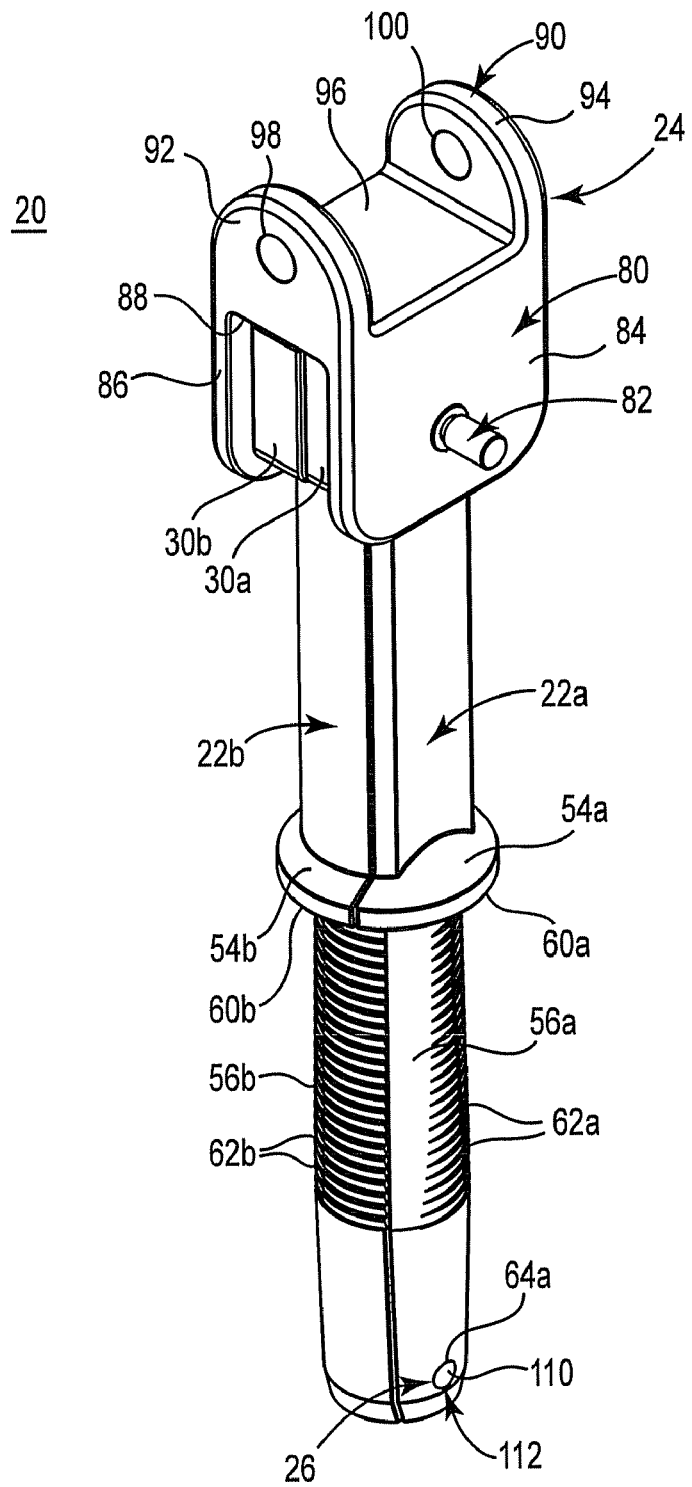
FIG. 1A is a side perspective view of a pipe gripper device in accordance with principles of the present disclosure and in a contracted state.
Figure 1B:
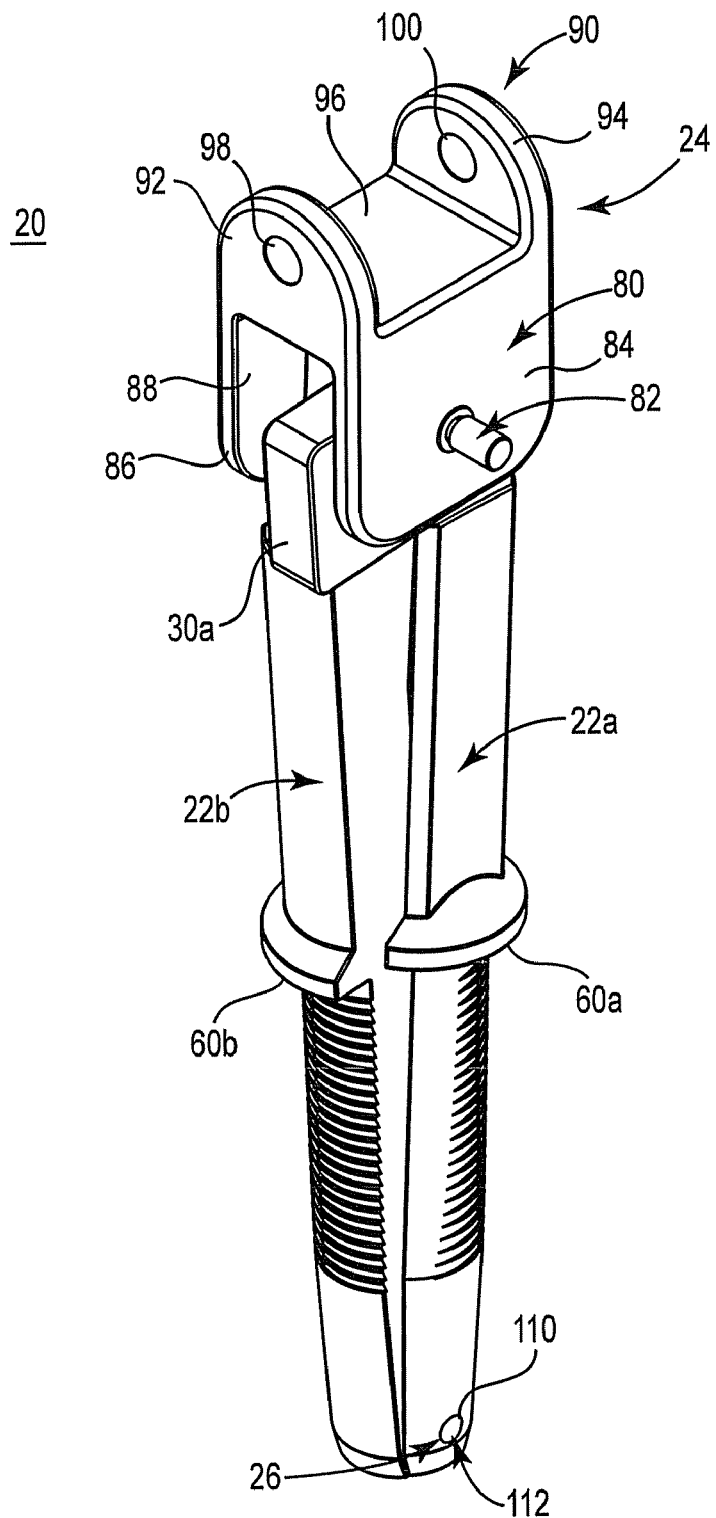
FIG. 1B is a perspective view of the gripper device of FIG. 1A in an expanded state.

One construction of a pipe gripper device 20 in accordance with principles of the present disclosure is shown in FIGS. 1A and 1B. The pipe gripper device 20 includes first and second gripper bodies 22a, 22b, a clevis assembly 24, and a hinge assembly 26 (referenced generally). Details on the various components are provided below. In general terms, however, the gripper bodies 22a, 22b are pivotably assembled to one another via the hinge assembly 26, with movement therebetween being constrained by the clevis assembly 24. With this construction, the gripper bodies 22a, 22b, and thus the pipe gripper device 20, are transitionable between a contracted state (FIG. 1A) and an expanded state (FIG. 1B). Further, the clevis assembly 24 is configured for attachment to a separate pulling device or mechanism (not shown) such that when the gripper bodies 22a, 22b are at least partially inserted within a pipe (not shown) and a pulling force is applied to the clevis assembly 24 in a direction opposite the gripper bodies 22a, 22b (e.g., an upward pulling force relative to the orientations of FIGS. 1A and 1B), the gripper device 20 self-transitions toward the expanded state and the pulling force is transmitted to the pipe via the gripper bodies 22a, 22b. Following completion of the pipe-pulling operation and the pulling force removed, the gripper device 20 is readily transitioned toward the contracted state of FIG. 1A, thereby permitting removal of the pipe gripper device 20 from the pipe.

In some constructions, the gripper bodies 22a, 22b are essentially identical. With this in mind, the first gripper body 22a is shown in greater detail in FIGS. 2A-2D, it being understood that the second gripper body 22b can have an essentially identical construction. Thus, corresponding elements of the first gripper body 22a are designated with the suffix "a" and elements of the second gripper body 22b are designated with the suffix "b".

The gripper body 22a general includes or defines a head 30a and an arm 32a. Further, and for reasons made clear below, the gripper body 22a can be viewed as having or defining an interior 34a (best shown in FIG. 2D) and an exterior 36a (best shown in FIG. 2C), with the interior 34a being "covered" and the exterior 36a being "exposed" upon final assembly of the first and second gripper bodies 22a, 22b (FIG. 1A). In general terms, the interior 34a includes one or more features configured to establish a sliding interface or engagement with a corresponding interior feature of the second gripper body 22b (FIG. 1A), and the exterior 36a incorporates one or more features adapted to engage a pipe interior surface. The gripper body 22a is formed of a rigid material, such as steel or other metal.

The head 30a can assume a variety of forms, and in some embodiments is square-like in shape as shown. Regardless, the head 30a forms or includes a slot 40a through a thickness thereof. The slot 40a is defined by first and second ends 42a, 44a, and extends at an angle θ relative to a longitudinal axis A of the gripper body 22a.

The arm 32a extends from the head 30a (e.g., the head 30a and the arm 32a can be integrally formed as a homogenous body), and terminates at a leading end 48a. With the one construction of FIGS. 2A-2D, the arm 32a is a continuous body, defining or forming a channel 50a (best seen in FIGS. 2A and 2B) extending along an intermediate segment 52a, a stop segment 54a, a grip segment 56a, and an insertion segment 58a. As described below, the channel 50a is sized to slidably receive a portion of the second gripper body 22b (FIG. 1A).

The intermediate segment 52a extends from the head 30a, and has a relatively uniform outer dimension. A longitudinal length of the intermediate segment 52a is selected to provide a desired leverage (mechanical advantage) for application of a force to an interior wall of a pipe as described below, as well as to provide an area for a user to grasp or handle the gripper device 20 (FIG. 1A). In some embodiments, the intermediate segment 52a has a length on the order of 4-5 inches, although other dimensions, either greater or lesser, are also acceptable.

The stop segment 54a extends from the intermediate segment 52a, and defines an increased outer dimension (e.g., radius) as compared to outer radial dimensions of the intermediate segment 52a and the grip segment 56a. The stop segment 54a terminates in a relatively flat shoulder 60a adjacent (or facing) the grip segment 56a and that is configured to abut a pipe end during use.

The grip segment 56a extends from the stop segment 54a, and is configured to frictionally engage an interior surface of a pipe, such as a plastic or metal pipe. For example, in some embodiments, the grip segment 56a forms a textured or structured surface 62a along the exterior 36a (best shown in FIG. 2C). Alternatively, other structural features can be incorporated into the grip segment 56a that otherwise serve to establish a robust, frictional interface with a pipe interior surface, and can include, for example, teeth, roughened protrusions, etc.

The insertion segment 58a extends from the grip segment 56a to the leading end 48a. In this regard, the insertion segment 58a has a reduced outer dimension at the leading end 48a (as compared to a corresponding outer dimension at the grip segment 56a). Further, the insertion segment 58a forms a bore 64a as part of the hinge assembly 26 (FIG. 1A) and at which the first gripper body 22a is pivotably connected to the second gripper body 22b (FIG. 1A) by a hinge pin (not shown). Optionally, one or more additional bores can be provided for reasons made clear below. Alternatively, the hinge assembly 26 can have other forms in which the insertion segment 58a includes other components or features configured to facilitate pivotable connection between the gripper bodies 22a, 22b and that may or may not include the bore 64a (e.g., the first gripper body 22a can form a post that is pivotably connected to the second gripper body 22b).

Figure 2A:
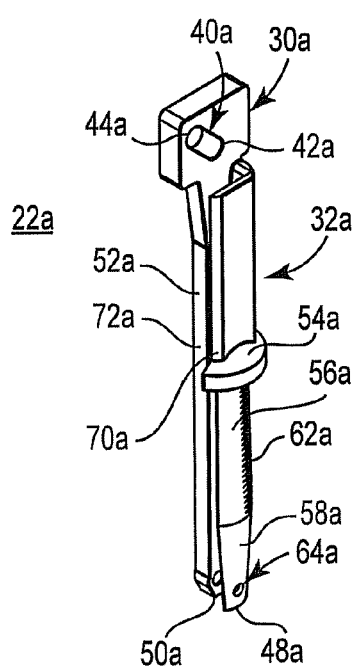
FIG. 2A is a front perspective view of a gripper body portion of the pipe gripper device of FIG. 1A.
Figure 2B:
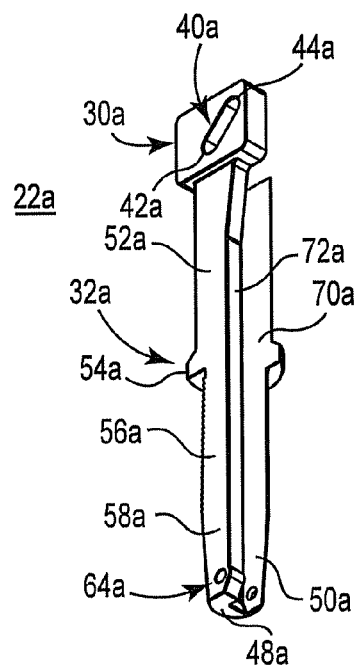
FIG. 2B is a rear perspective view of the gripper body of FIG. 2A.
Figure 2C:
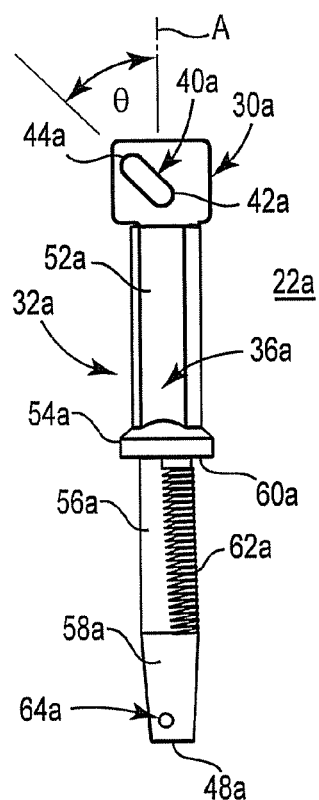
FIG. 2C is a side view of the gripper body of FIG. 2A.
Figure 2D:
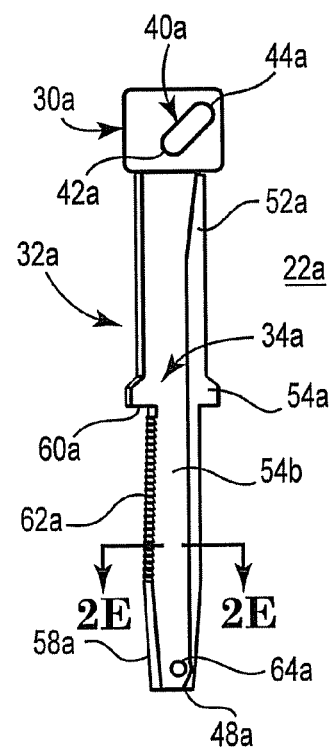
FIG. 2D is an opposite side view of the gripper body of FIG. 2C.
Figure 2E:
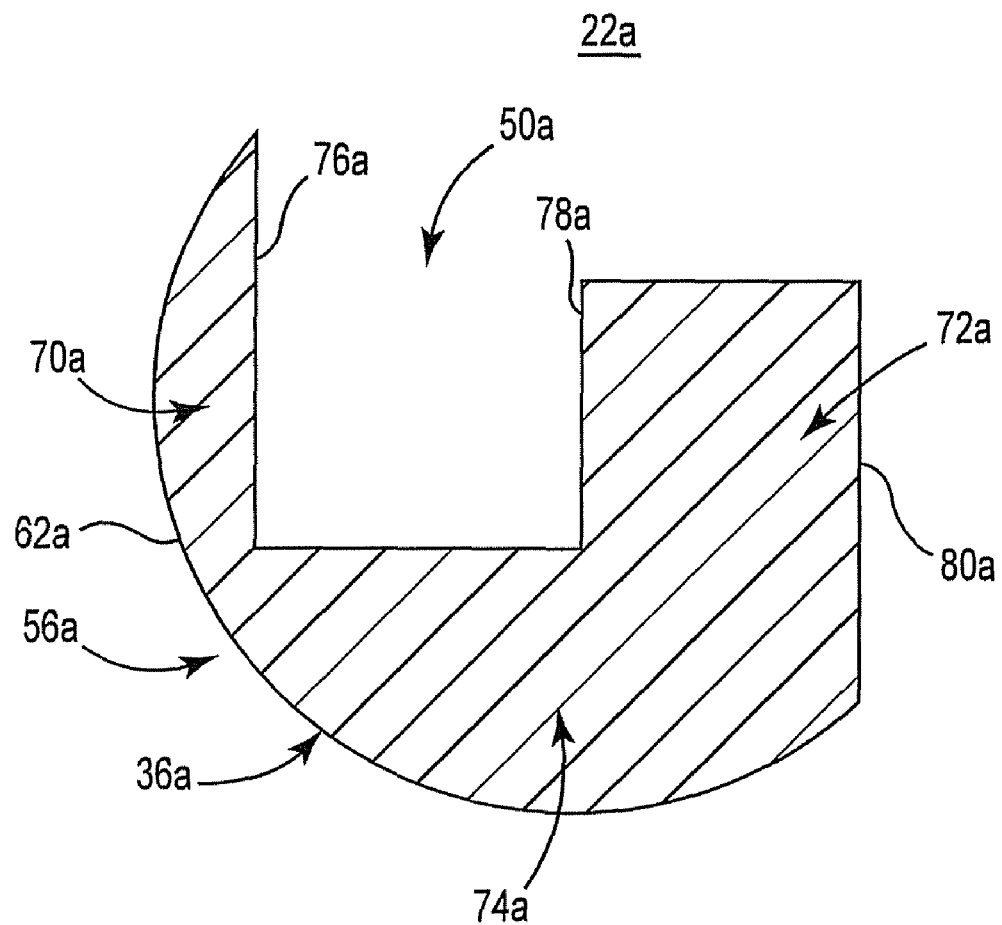
FIG. 2E is an enlarged, simplified cross-sectional view of the gripper body of FIG. 2D, taken along the line 2E-2E.

As mentioned above, the exterior 36a, and in particular along the grip segment 56a, serves to establish a gripped interface with a pipe interior surface. The interior 34a, in turn, promotes a slidable interface between the gripper bodies 22a, 22b (FIG. 1A). Various constructions can be employed to achieve this interface. With the but one acceptable construction of FIGS. 2A-2D, the arm 32a includes first and second walls 70a, 72a. As shown in FIG. 2E, the walls 70a, 72a project from a main body portion 74a in a spaced fashion to define the channel 50a. More particularly, the channel 50a is defined by opposing first and second surfaces 76a, 78a, with the first surface 76a being formed by the first wall 70a and the second surface 78a formed by the second wall 72a. As a point of reference, the second wall 72a further forms a third surface 80a opposite the second surface 78a, with the exterior 36a contiguously defined by the first wall 70a and the main body portion 74a (e.g., relative to the grip segment 56a reflected in FIG. 2E, the textured surface 62a is continuously formed along the main body portion 74a and the first wall 70a). The surfaces 76a, 78a are flat. A lateral width of the channel 50a corresponds with a thickness of the second wall 72a such that upon assembly to the second gripper body 22b (FIG. 1A) and as described in greater detail below, the second wall 72b of the second gripper body 22b nests within the channel 50a of the first gripper body 22a (and vice-versa).

Returning to FIGS. 1A and 1B, the clevis assembly 24 is coupled to the heads 30a, 30b of the gripper bodies 22a, 22b, and includes a clevis 80 and a pin 82. The clevis 80 can assume a variety of forms, and generally includes opposing legs 84, 86 that establish a gap 88 sized to receive the heads 30a, 30b. The clevis 80 further forms an attachment feature 90 (referenced generally) configured to facilitate mounting of the pipe gripper device 20 to a pulling mechanism or other component (e.g., strap or rope). For example, with the but one acceptable construction of FIGS. 1A and 1B, the clevis 80 forms opposing ears 92, 94 and a platform 96. The ears 92, 94 project upwardly from the platform 96, and each form a bore 98, 100, respectively. The platform 96 can have a generally flat surface. With this construction, a separately-provided strap or similar device (not shown) can be placed along the platform 96 and captured relative thereto via a dowel (not shown) extending between, and secured to, the ears 92, 94 (via the corresponding bores 98, 100).

The pin 82 is sized in accordance with the slot 40a, 40b (FIGS. 2A-2D) formed by the heads 30a, 30b, respectively. More particularly, the pin 82 is sized to be slidably received within the respective slots 40a, 40b, such that the heads 30a, 30b can slide relative to the clevis assembly 24 via the pin/slot interface as described in greater detail below.

Figure 3:
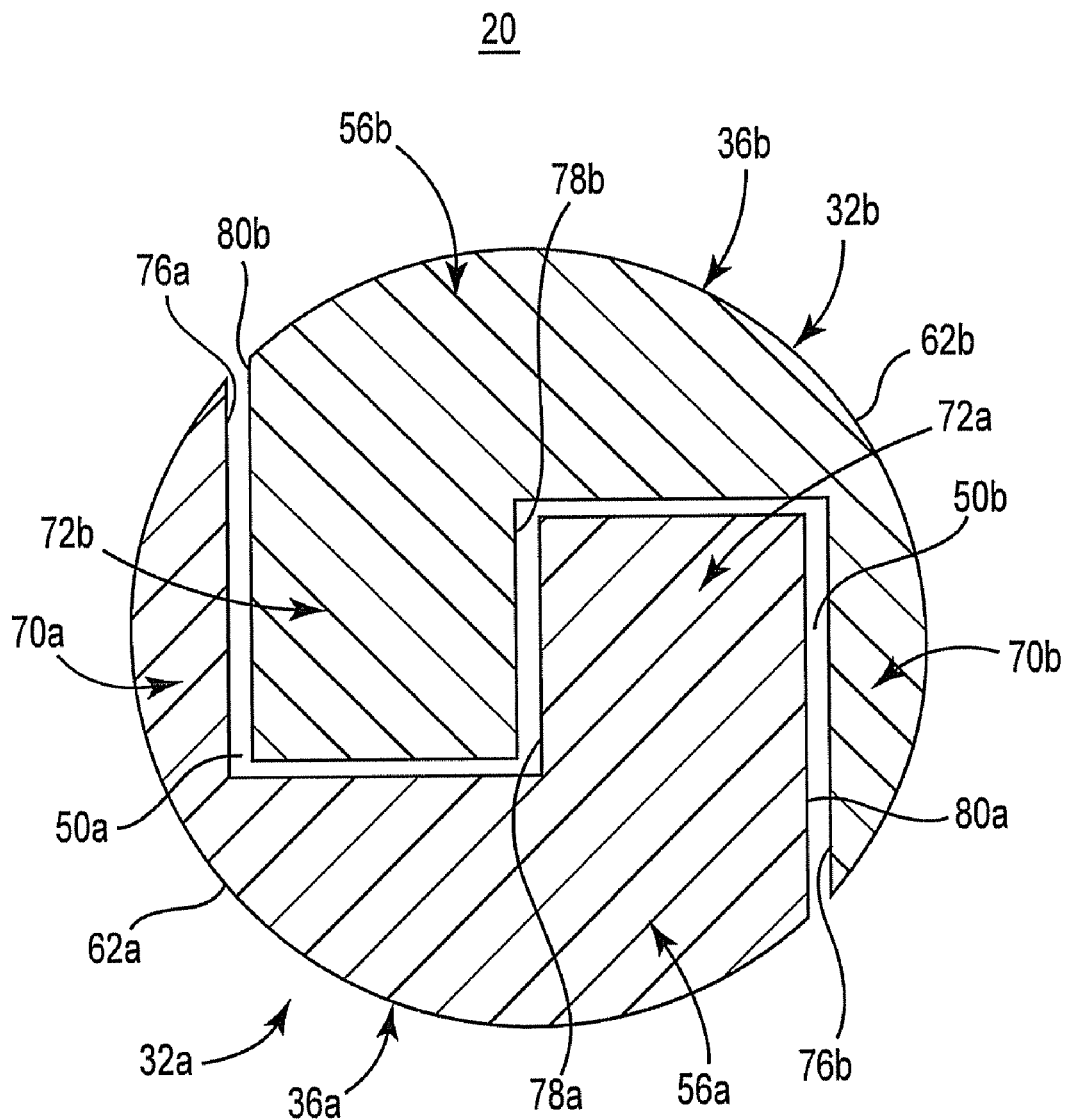
FIG. 3 is a simplified cross-sectional view of the pipe gripper device of FIG. 1A.

Assembly of the pipe gripper device 20 includes assembling the first and second gripper bodies 22a, 22b to one another. As best shown in FIG. 3, the second wall 72a of the first arm 32a slidably nests within the channel 50b of the second arm 32b. Similarly, the second wall 72b of the second arm 32b slidably nests within the channel 50a of the first arm 32a. Thus, the second surfaces 78a, 78b face one another, the third surface 80a of the first arm 32a faces (and is "covered" by) the first surface 76b of the second arm 32b, and the third surface 80b of the second arm 32b faces (and is "covered" by) the first surface 76a of the first arm 32a. The exteriors 36a, 36b combine to provide the pipe gripper device 20 with a relatively continuous perimeter in transverse cross-section. For example, relative to the grip segments 56a, 56b reflected in FIG. 3, the textured surfaces 62a, 62b are continuous relative to one another, providing the pipe gripper device 20 with a textured surface perimeter. Returning to FIG. 1A, the heads 30a, 30b are arranged side-by-side, in sliding contact (or near contact) with one another. Finally, the hinge assembly 26 includes a hinge pin 110 pivotably that couples the gripper bodies 22a, 22b at the corresponding bores 64a, 64b, thereby creating a pivot point 112. In some constructions, the hinge pin 110 is permanently assembled to the bores 64a, 64b (e.g., the hinge pin 110 is fixed to the first gripper body bore 64a and is more loosely captured within the second gripper body bore 64b such that the second gripper body 22b can rotate about the hinge pin 110). Optionally, one or both of the gripper bodies 22a, 22b can form a plurality of spaced apart bores 64a or 64b at different locations to permit a user to select a desired outer diameter or "size" of the device 20 and/or location of the pivot point 112 as described below. In the contracted state of FIG. 1A, the stop segments 54a, 54b combine to define a circumferential flange-like structure (i.e., the shoulders 60a, 60b are radially aligned), and the grip segments 56a, 56b combine to form a cylindrical-type arrangement, with the textured surfaces 62a, 62b being relatively continuous.

Figure 4A:
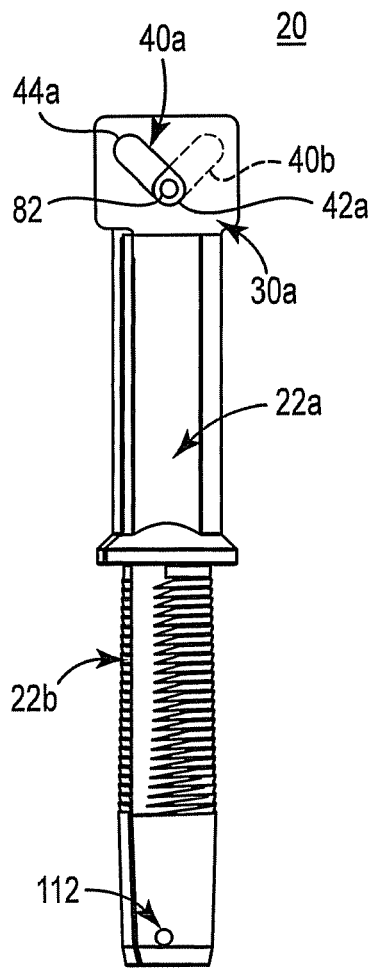
FIG. 4A is a side view of the pipe gripper device of FIG. 1A with a clevis component removed and in a contracted state.
Figure 4B:
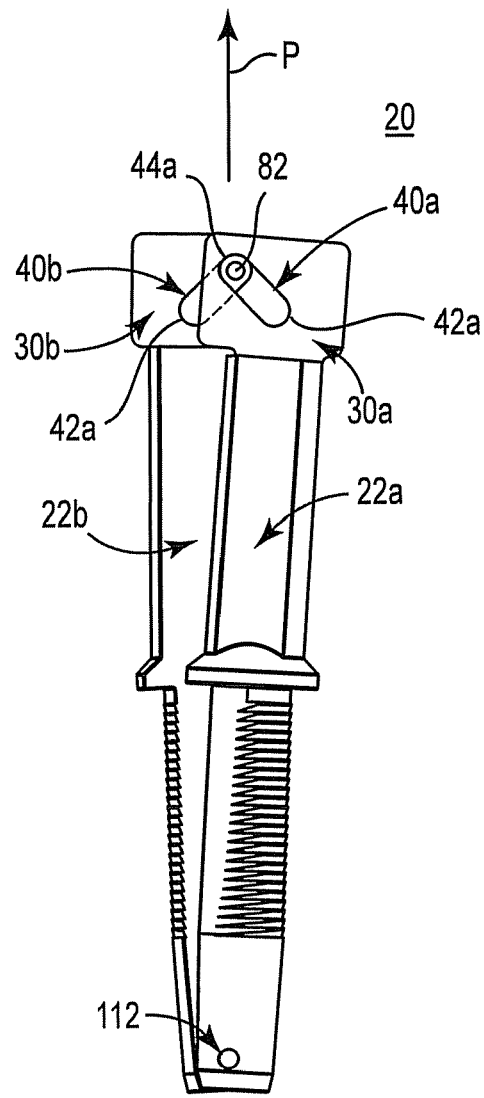
FIG. 4B is a side view of the pipe gripper device of FIG. 4A in an expanded state.

The clevis assembly 24 is mounted to the so-assembled gripper bodies 22a, 22b by arranging the heads 30a, 30b within the gap 88 of the clevis 80. The pin 82 is extended between the legs 84, 86, passing through the slot 40a, 40b (hidden in FIG. 1A, but shown in FIGS. 2A-2D) of each of the gripper bodies 22a, 22b. Arrangement of the pin 82 relative to the slots 40a, 40b is better reflected in FIG. 4A that otherwise illustrates the pipe gripper device 20 with the clevis 80 removed; the slot 40a of the first gripper body 22a is visible in the view of FIG. 4A, as is the pin 82 otherwise arranged therein. While the second gripper body 22b is largely hidden in the view of FIG. 4A, the slot 40b is shown with dotted lines. The gripper bodies 22a, 22b are arranged such that the slots 40a, 40b are conversely oriented relative to one another, effectively combining to define an angle that is twice the extension angle $\theta$ (FIG. 2C). Regardless, the pin 82 is slidably disposed within each of the slots 40a, 40b. In some embodiments, rollers, sleeves, or similar devices can be incorporated (e.g., rotatably assembled over the pin 82) to lessen friction, distribute load, and reduce wear at the pin 82 interface within the slots 40a, 40b. As a point of reference, FIG. 4A illustrates the gripper bodies 22a, 22b in the contracted state in which the pin 82 is located at the first ends 42a, 42b of the slots 40a, 40b. In the expanded state of FIG. 4B, the pin 82 is located at the second end 44a, 44b of the slots 40a, 40b.

The slidable, captured arrangement of the pin 82 relative to the slots 40a, 40b controls or dictates the state or arrangement of the gripper bodies 22a, 22b relative to one another. Application of a pulling force P onto the pin 82 in a direction opposite the arms 32a, 32b (e.g., upwardly relative to the orientation of FIGS. 4A and 4B) causes the pin 82 to slide within each of the slots 40a, 40b, moving from the first ends 42a, 42b toward the second ends 44a, 44b; this action, in turn, causes the gripper bodies 22a, 22b to transition toward the expanded state, pivoting at the pivot point 112. In this regard, the extension angle θ (FIG. 2C) of the slots 40a, 40b dictates the rate of motion between the contracted and expanded states, as well as the application of force to the heads 30a, 30b. The extension angle θ can be functionally greater than 0° and less than 90°. In some embodiments, the extension angle θ is in the range of 30°-60°. Where the extension angle θ is 45°, the displacement of the gripper body heads 30a, 30b perpendicular to a center axis of the gripper device 20 (i.e., the longitudinal axis A in FIG. 2C) will be approximately equal to the axial displacement of the pin 82. Also, at the extension angle θ of 45°, the component of the forces applied to the heads 30a, 30b (ignoring frictional losses) parallel to their directions of motion is equal to one-half the pulling force P applied to the pin 82 via the clevis 80. Where the extension angle θ is greater than 45°, the relative motion of the heads 30a, 30b will increase and the force components will decrease. Conversely, where the extension angle θ is less than 45°, the relative motions of the heads 30a, 30b will decrease and the force components will increase. Finally, while centerlines of the slots 40a, 40b, respectively, are illustrated as being linear in extension, other configurations are also envisioned. For example, the centerlines of the slots 40a, 40b can be arcuate or curvilinear such that the extension angle θ and the corresponding rates of motion and force application to the heads 30a, 30b vary as a function of an axial position of the pin 82 relative to the slots 40a, 40b.

Figure 5:
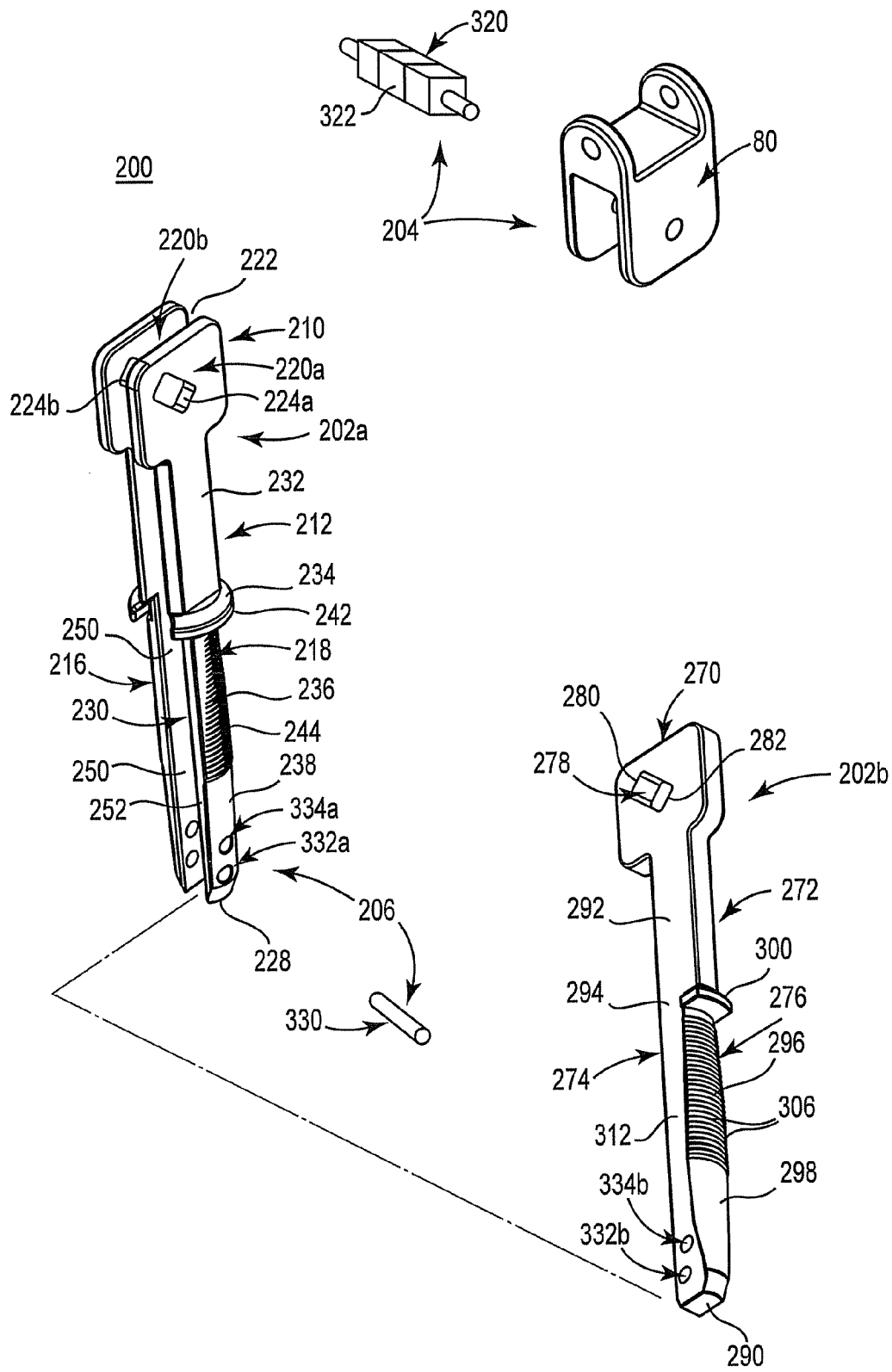
FIG. 5 is an exploded perspective view of another pipe gripper device in accordance with principles of the present disclosure.

Another construction of a pipe gripper device 200 in accordance with principles of the present disclosure is shown in FIG. 5. The pipe gripper device 200 is akin to the pipe gripper device 20 (FIG. 1A) described above, and includes first and second gripper bodies 202a, 202b, a clevis assembly 204, and a hinge assembly 206 (referenced generally). Details on the various components are provided below. In general terms, however, as with the pipe gripper device 20, the gripper bodies 202a, 202b are pivotably assembled to one another via the hinge assembly 206, with movement therebetween being constrained by the clevis assembly 204. With this construction, the gripper bodies 202a, 202b, and thus the pipe gripper device 200, are transitionable between a contracted state and an expanded state as described below. Further, the clevis assembly 204 is configured for attachment to a separate pulling device or mechanism (not shown), such that when the gripper bodies 202a, 202b are at least partially inserted within a pipe (not shown) and a pulling force is applied to the clevis assembly 204 (in a direction opposite the gripper bodies 202a, 202b), the pipe gripper device 200 self-transitions toward the expanded state and the pulling force is transferred to the pipe via the gripper bodies 202a, 202b. Following completion of the pipe-pulling operation and removal of the pulling force, the pipe gripper device 200 is readily transitioned to the contracted state, thereby permitting removal of the pipe gripper device 200 from the pipe.

The gripper bodies 202a, 202b are configured for assembly to one another, and provide certain corresponding or mating features akin to those described above with respect to the pipe gripper device 20 (FIG. 1A). Unlike the pipe gripper device 20, however, with the embodiment of FIG. 5, the gripper bodies 202a, 202b are not identical. For example, and with additional reference to FIGS. 6A-6C, the first gripper body 202a includes or defines a head 210 and an elongated arm 212. Further, the first gripper body 202a can be viewed as having or defining an interior 216 (best reflected in FIGS. 5 and 6C) and an exterior 218 (best reflected in FIGS. 6A-6C), with the interior 216 being "covered" and the exterior 218 being "exposed" upon final assembly of first and second gripper bodies 202a, 202b. In general terms, the interior 216 includes one or more features adapted to establish a sliding interface or engagement with a corresponding interior feature of the second gripper body 202b, and the exterior 218 incorporates one or more features adapted to engage a pipe interior surface.

The head 210 can include first and second head segments 220a, 220b. The head segments 220a, 220b are identical in construction, and are transversely spaced from one another in defining a gap 222. Each of the head segments 220a, 220b can be similar to the head 30a (FIG. 2A) described above, and forms or includes a slot 224a, 224b, respectively, through a thickness thereof. The slots 224a, 224b are identical and co-planar, with the first slot 224a being shown in greater detail in FIG. 6B. The slot 224a is defined by first and second ends 226a, 228a, and extends at an extension angle θ relative to a longitudinal axis A of the first gripper body 202a. The extension angle θ can be functionally greater than 0° and less than 90°. In some constructions, the extension angle θ is in the range of 30°-60°, and in yet other embodiments is 45° as described above with respect to the gripper device 20. Although the provision of the two head segments 220a, 220b beneficially provides force balancing via symmetry when assembled to a corresponding component of the second gripper body 202b, in other constructions the head 210 consists of a single one of the head segments 220a or 220b.

The elongated arm 212 extends from the head 210 (e.g., the head 210 and the arm 212 can be integrally formed as a homogenous body), and terminates at a leading end 228. With the one construction of FIGS. 5 and 6A-6C, the arm 212 is a continuous body, defining or forming a channel 230 (FIG. 6C) extending along an intermediate segment 232, a stop segment 234, a grip segment 236, and an insertion segment 238. As described below, the channel 230 is sized to slidably receive a portion of the second gripper body 202b.

The intermediate segment 232 extends from the head 210 at a relatively uniform outer dimension. A longitudinal length of the intermediate segment 232 is selected to provide a desired leverage (mechanical advantage) for application of a force onto an interior wall of a pipe as described below, as well as to provide an area for a user to grasp or handle the pipe gripper device 200. In some constructions, the intermediate segment 232 has a length on the order of 4-5 inches, although other dimensions, either greater or lesser, are also acceptable.

The stop segment 234 extends from the intermediate segment 232 and defines an increased outer dimension (e.g., radius) as compared to outer radial dimensions of the intermediate segment 232 and the grip segment 236. The stop segment 234 terminates in a relatively flat shoulder 242 adjacent (or facing) the grip segment 236 and that is configured to abut a pipe end during use.

Figure 6A:
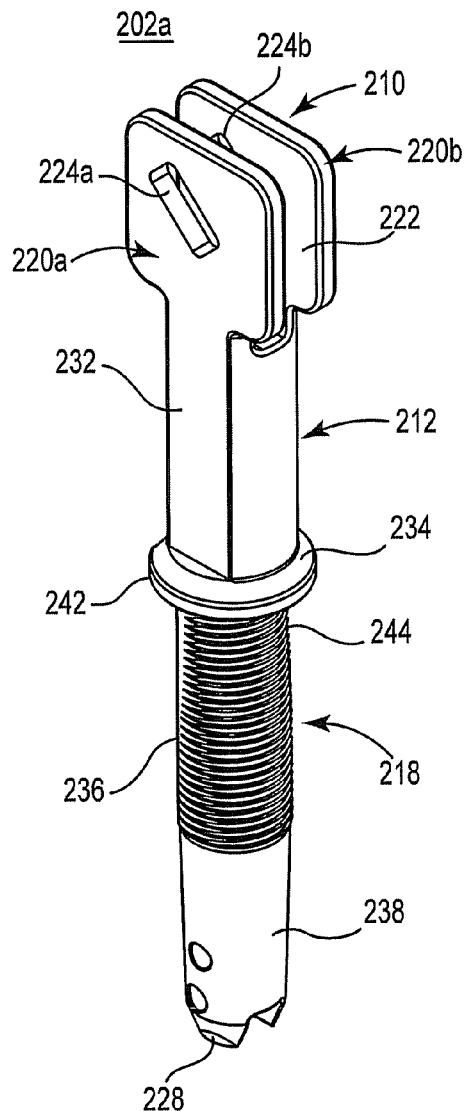
FIG. 6A is a perspective view of a first gripper body portion of the pipe gripper device of FIG. 5.
Figure 6B:
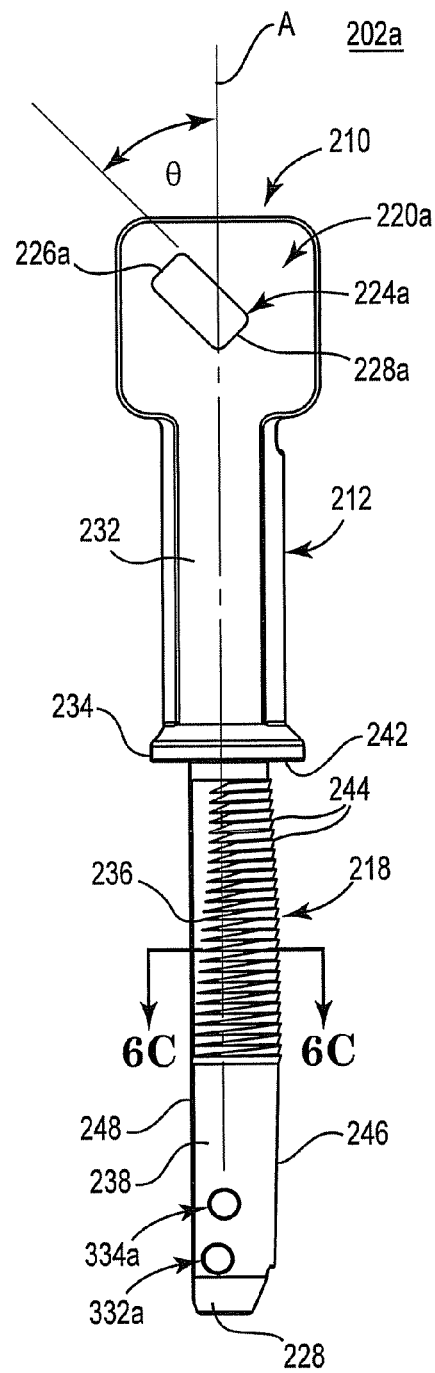
FIG. 6B is a side plan view of the first gripper body of FIG. 6A.

The grip segment 236 extends from the stop segment 234, and is configured to frictionally engage an interior surface of the pipe, such as a plastic or metal pipe. For example, in some constructions, the grip segment 236 forms a textured or structured surface 244 along the exterior 218 (as best shown in FIGS. 6A and 6B). Alternatively, other structural features can be incorporated into the exterior 218 along the grip segment 236 that otherwise serve to establish a robust frictional interface with a pipe interior surface, and can include, for example, teeth, roughened protrusions, etc.

The insertion segment 238 extends from the grip segment 236 to the leading end 228. In this regard, the insertion segment 238 has a reduced outer dimension at the leading end 228 (as compared to a corresponding outer dimension at the grip segment 236). For example, relative to the side plan view of FIG. 6B, the arm 212 defines opposing, first and second sides 246, 248. The first side 246 tapers toward the second side 248 in extension from the grip segment 236 to the leading end 228.

Figure 6C:
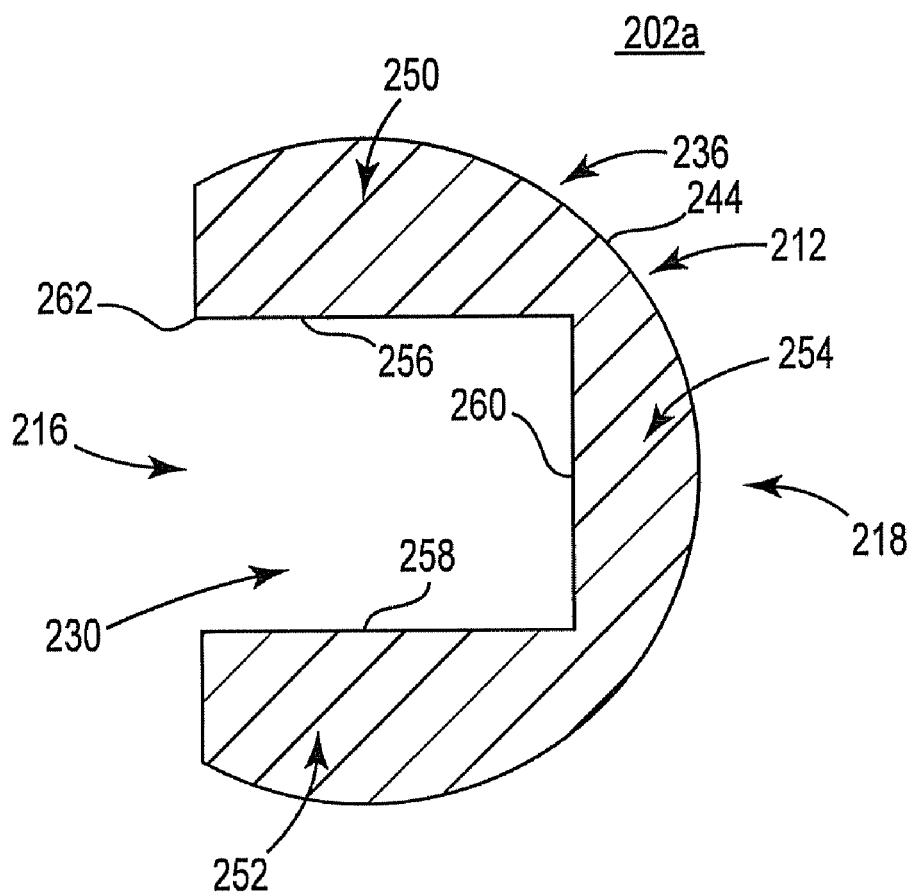
FIG. 6C is an enlarged, simplified cross-sectional view of the first gripper body of FIG. 6B, taken along the line 6C-6C.

As mentioned above, the exterior 218, and in particular along the grip segment 236, serves to establish a gripped interface with the pipe interior surface. The interior 216, in turn, promotes a slidable interface between the gripper bodies 202a, 202b. As best shown in FIG. 6C, the arm 212 includes first and second walls 250, 252 projecting from a main body portion 254 in a spaced fashion to form the channel 230. More particularly, the channel 230 is defined by opposing, first and second surfaces 256, 258, and a third surface 260 extending between the first and second surfaces 256, 258. The first surface 256 is formed by the first wall 250, and the second surface is formed by the second wall 252. Relative to at least the grip segment 236 reflected in FIG. 6C, the walls 250, 252 and the main body portion 254 combine to create a U-like shape, with the exterior 218 being contiguously defined along the walls 250, 252 and the main body portion 254 (e.g., the textured surface 244 is continuous along the walls 250, 252 and the main body portion 254). Regardless, the channel 230 has an open side 262. The first and second surfaces 256, 258 are flat, whereas the exterior 218 is circular (in transverse cross-section). As described below, a width of the channel 230 corresponds with a thickness of a component of the second gripper body 202b.

Figure 7B:
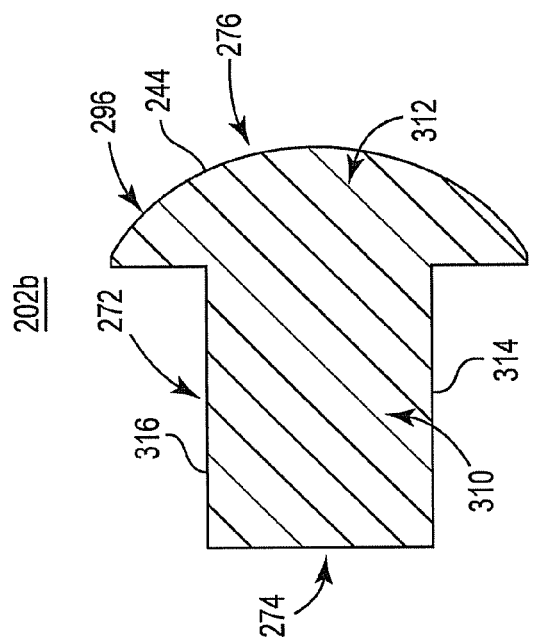
FIG. 7B is an enlarged, simplified cross-sectional view of the second gripper body of FIG. 7A, taken along the line 7B-7B.
Figure 7A:
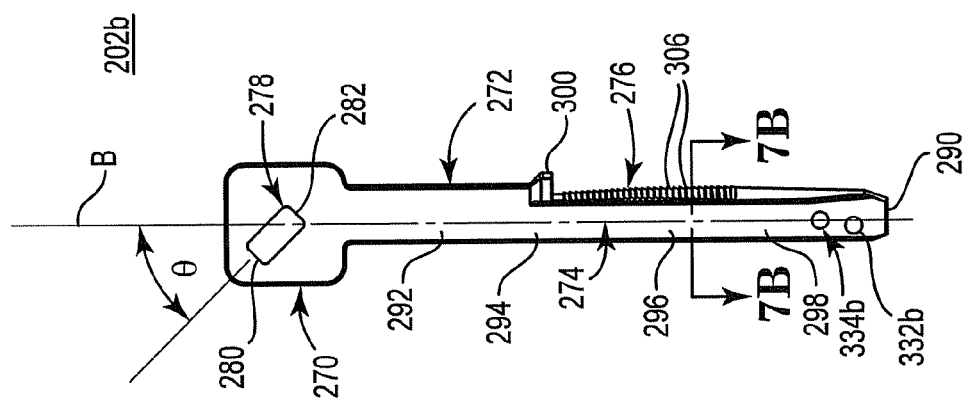
FIG. 7A is a side plan view of a second gripper body portion of the gripper device of FIG. 5.

With reference to FIGS. 5, 7A, and 7B, the second gripper body 202b is akin to the first gripper body 202a in certain respects, and includes a head 270 and an elongated arm 272. Further, the second gripper body 202b can be viewed as having or defining an interior 274 (best shown in FIG. 7B) and an exterior 276 (best shown in FIG. 5), with the interior 274 being "covered" and the exterior 276 being "exposed" upon final assembly of the gripper bodies 202a, 202b. In general terms, the interior 274 includes one or more features adapted to slidably interface or engage with the interior 216 of the first gripper body 202a, whereas the exterior 276 incorporates one or more features adapted to function in concert with the exterior 218 of the first gripper body 202a in engaging a pipe interior surface.

The head 270 can have the square-like shape as shown. A thickness of the head 270 corresponds with a width of the gap 222 of the first gripper body head 210, and forms or includes a slot 278. The slot 278 is akin to the slots 224a, 224b described above, and extends between first and second ends 280, 282 at the angle θ relative to a longitudinal axis B of the second gripper body 202b.

The elongated arm 272 extends from the head 270, and terminates at a leading end 290. Further, the elongated arm 272 defines or forms an intermediate segment 292, a stop segment 294, a grip segment 296, and an insertion segment 298. The segments 292-298 are akin to the corresponding segments 232-238 of the first gripper body 202a, effectively forming a completed circumferential feature upon assembly of the gripper bodies 202a, 202b. For example, the stop segment 294 forms a shoulder 300 that, upon assembly of the gripper bodies 202a, 202b, combines with the shoulder 242 of the first gripper body 202a to define a circumferential-like flange. Further, the grip segment 296 forms a textured or structured surface 306 along the exterior 276 that circumferentially "completes" the textured surface 244 associated with the first gripper body 202a. Finally, the insertion segment 298 can define a taper in extension from the grip segment 296 to the leading end 290 commensurate with the taper of the first gripper body 202a described above.

In more general terms, and as reflected in FIG. 7B, the stop, grip and insertion segments 294, 296, 298 of the arm 272 can be generally T-shaped in transverse cross-section, defined by a wall 310 projecting from a main body portion 312. The wall 310 has a thickness between opposing surfaces 314, 316, with this thickness approximating (e.g., slightly less than) a width of the first gripper body channel 230 (FIG. 6C). The surfaces 314, 316 are flat, and promote sliding interface with a corresponding one of the surfaces 256, 258 (FIG. 6C) of the first gripper body 202a. Further, and at least with respect to the grip segment 296 reflected in FIG. 7B, the main body portion 312 defines the textured surface 244 and can have a width (e.g., arclength) that is greater than a width of the first gripper body channel 230. Pointedly, the main body portion 312 circumferentially "completes" the exterior of the first gripper body 202a.

Returning to FIG. 5, the clevis assembly 204 couples the heads 210, 270 of the gripper bodies 202a, 202b to one another, and includes the clevis 80 as described above, and a pin 320. The pin 320 is sized in accordance with the slots 224a, 224b, 278. More particularly, the pin 320 is sized to be slidably received within the respective slots 224a, 224b, 278 such that the heads 210, 270 can slide relative to the clevis assembly 204 via the pin/slot interface. In some embodiments, one or more bearings 322 are rotatably assembled over the pin 320, and the slots 224a, 224b have a width slightly greater than a cross-sectional width of the bearings 322. For example, the bearings 322 can be in the form of square rings fitted over a cylindrical pin. With this construction, the bearings 322 can rotate or "tumble" within the slots 224a, 224b, 278, thereby utilizing all four sides of the square perimeter to minimize wear/failure over time. Alternatively, the bearings 322 can be omitted.

The hinge assembly 206 can assume a variety of forms, and in some embodiments is optionally configured to provide a user with the ability to select a working outer dimension of the pipe gripper device 200. For example, the hinge assembly 206 can include a hinge pin 330 selectively assembled to one or more bores formed in the gripper bodies 202a, 202b. In particular, the gripper bodies 202a, 202b can each form or include a first bore 332a, 332b, respectively, and a second bore 334a, 334b, respectively. As a point of reference, with embodiments in which the first gripper body 202a includes the channel 230, the first and second bores 332a, 334a are formed through both of the first and second walls 250, 252. Regardless, a distance between the first bore 332a of the first gripper body 202a and the leading end 228 thereof corresponds with a distance between the first bore 332b of the second gripper body 202b and the leading end 290 thereof. Distances between the second bore 334a, 334b and the corresponding gripper body leading end 228, 290 are also identical. In addition to this longitudinal offset and with specific reference to FIG. 6B, the first bore 332a can be radially offset from the second bore 334a (i.e., FIG. 6B illustrates that a radial or transverse location of the first bore 332a relative to the longitudinal axis A differs from that of the second bore 334a relative to the axis A). An identical radial offset can be established between the first and second bores 332b, 334b of the second gripper body 202b (reflected in FIG. 7A), or the radial offset can differ. In yet other embodiments, the first and second bores 332a, 334a are longitudinally offset and radially aligned; and in even other embodiments, the first and second bores 332a, 334a are radially offset and longitudinally aligned. Regardless, and returning to FIG. 5, where the hinge pin 330 connects the first bores 332a, 332b (i.e., a first hinge position), an outer dimension collectively defined by the gripper bodies 202a, 202b is greater than a collective outer dimension generated by the hinge pin 330 being assembled to the second bores 334a, 334b (i.e., a second hinge position). For example, the first hinge position can be employed for use with a CL 160 plastic pipe (1.75 inch inner diameter), and the second hinge position appropriate for an SCH 40 plastic pipe (1.61 inch inner diameter). The hinge pin 330 is configured to be removably assembled to the bores 332a, 332b, 334a, 334b so as to facilitate user assembly/removal. In this regard, a configuration of the hinge pin 330 and/or the bores 332a, 332b, 334a, 334b is such that upon assembly, the hinge pin 330 is rotatably fixed or constrained relative to one of the gripper bodies 202a or 202b, and is more loosely captured relative to the other gripper body 202a or 202b such that the other gripper body 202a or 202b can rotate about the hinge pin 330. Alternatively, the hinge assembly 206 can have a more permanent configuration akin to the hinge assembly 26 (FIG. 1A) above.

Figure 8C:
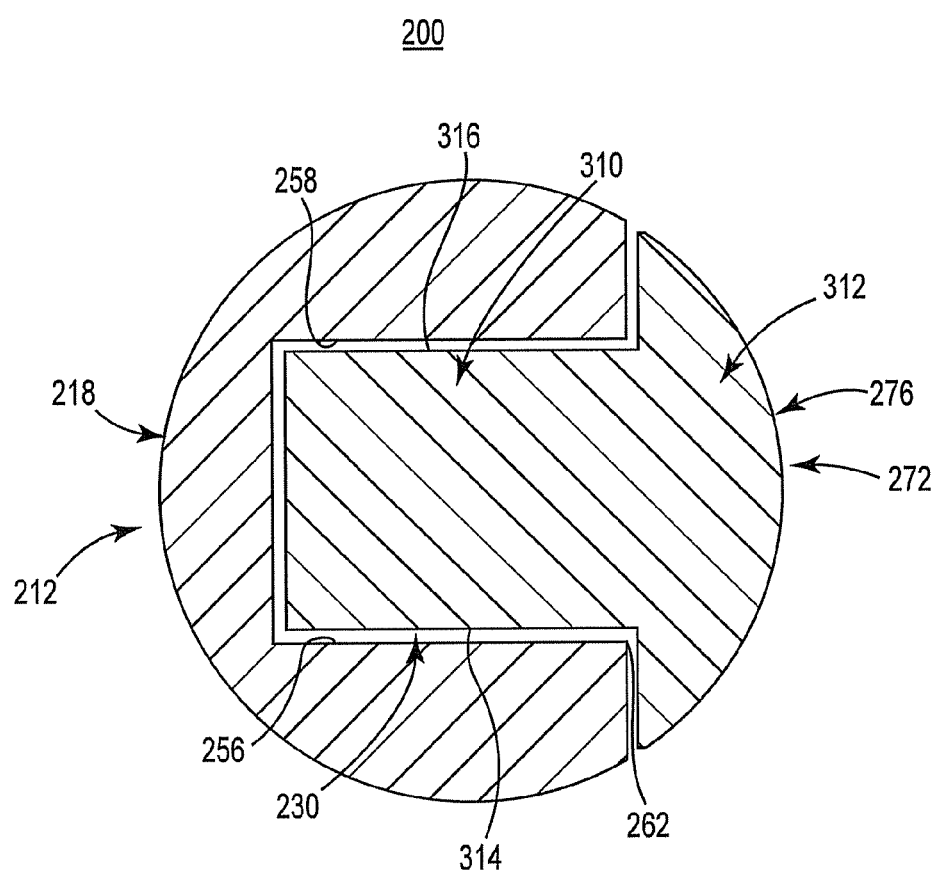
FIG. 8C is an enlarged, simplified cross-sectional view of the pipe gripper device of FIG. 8B, taken along the line 8C-8C.

Final assembly of the pipe gripper device 200 is shown in FIGS. 8A-8C and generally includes a portion of the second gripper body arm 272 slidably nested within the channel 230 of the first gripper body arm 212. More particularly, the second gripper body wall 310 is slidably nested within the first gripper body channel 230 as best shown in FIG. 8C. The first surface 314 of the second gripper body arm 272 slidably abuts the first surface 256 of the first gripper body arm 212, and the second surface 316 slidably abuts the second surface 258. The second gripper body main body 312 projects beyond the open end 262 of the channel 230. The exteriors 218, 276 combine to form the pipe gripper device 200 to have a relatively continuous perimeter. Further, the second gripper body head 270 is nested within the gap 222 between the first gripper body head segments 220a, 220b, with the clevis assembly 204 retaining the heads 210, 270 relative to one another in a slidable fashion as described above. Finally, the hinge assembly 206, and in particular the hinge pin 330, pivotably couples the gripper bodies 202a, 202b to one another adjacent the respective leading ends 228, 290.

Figure 9A:
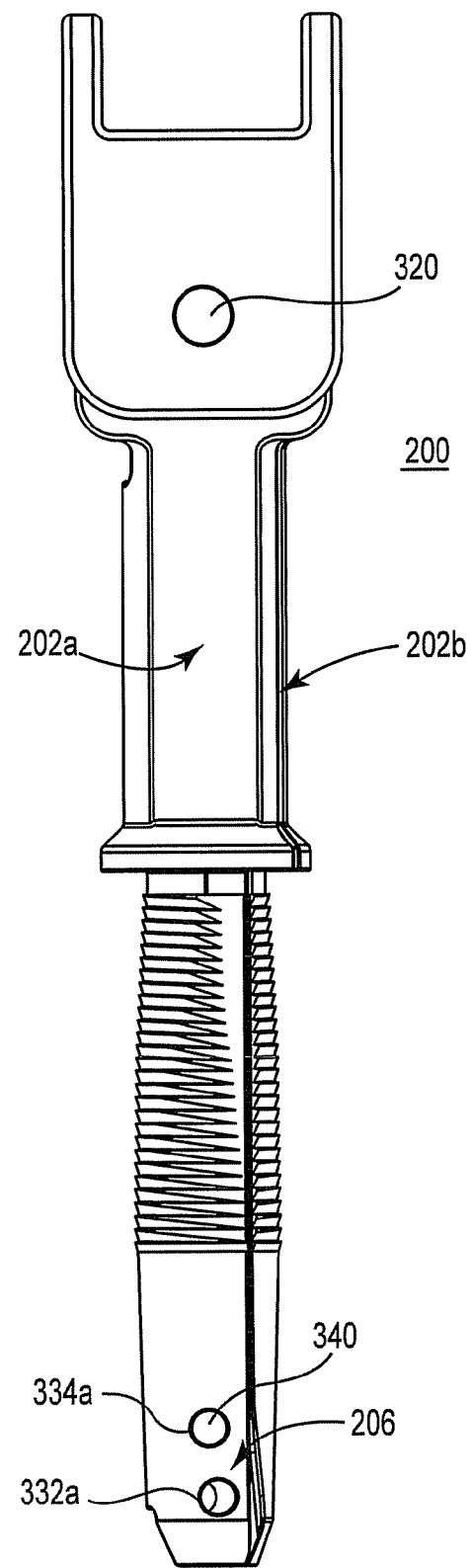
FIG. 9A is a side view of the pipe gripper device of FIG. 5 in a contracted state.
Figure 9B:
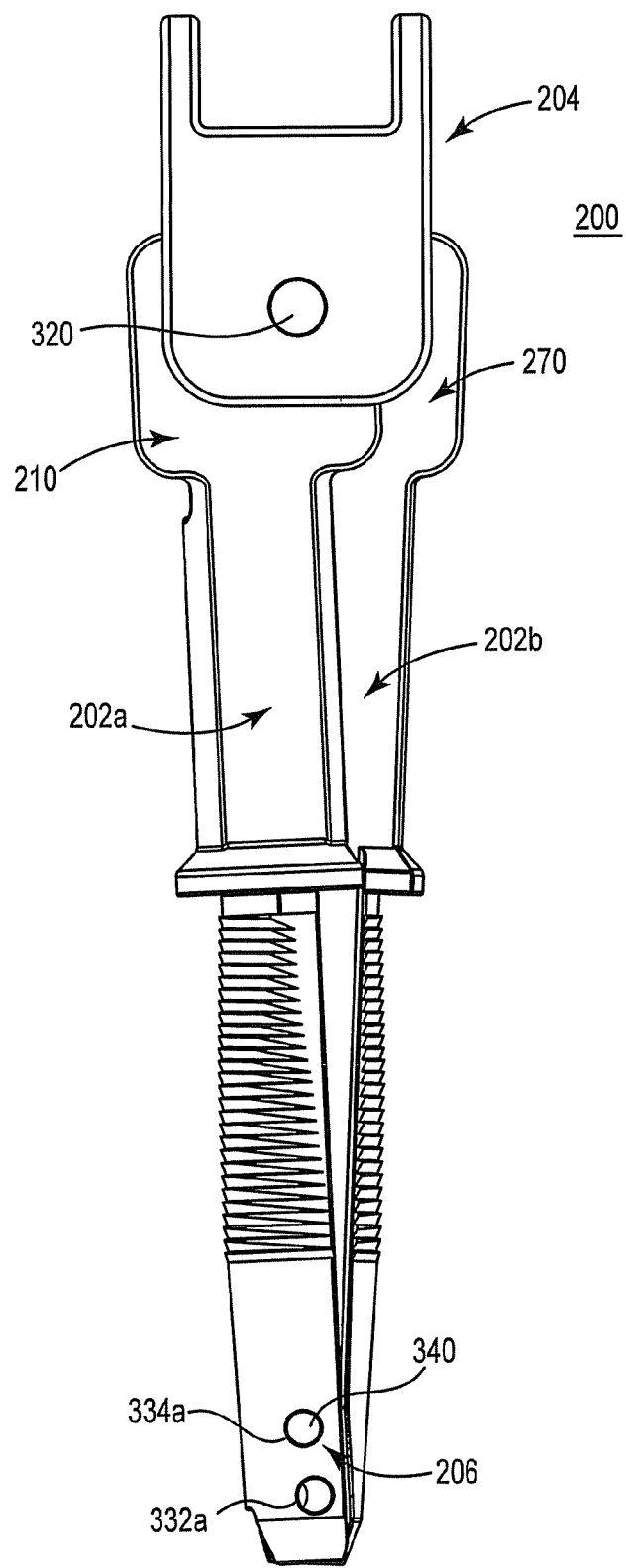
FIG. 9B is a side view of the pipe gripper device of FIG. 5 in an expanded state.

As shown in FIGS. 9A and 9B, upon final assembly, the pipe gripper device 200 is transitionable between a contracted state (FIG. 9A) and an expanded state (FIG. 9B). The hinge assembly 206 pivotably couples the gripper bodies 202a, 202b to one another at a pivot point 340. As a point of reference, the pivot point 340 is defined at the second bores 334a, 334b (with the second bore 334b of the second gripper body 202b being hidden in the views of FIGS. 9A and 9B). Optional selection of a differing pivot point is described in greater detail below. The clevis assembly 204 is coupled to the heads 210, 270 in a manner corresponding with the description provided above with respect to the pipe gripper device 20 (FIGS. 1A and 1B). Thus, the pin 320 interfaces with the slots 224a, 224b, 278 (FIG. 5) as described above with respect to FIGS. 4A and 4B. Transitioning of the pipe gripper device 200 between the contracted and expanded state occurs in a manner consistent with previous explanations.

Figure 10A:
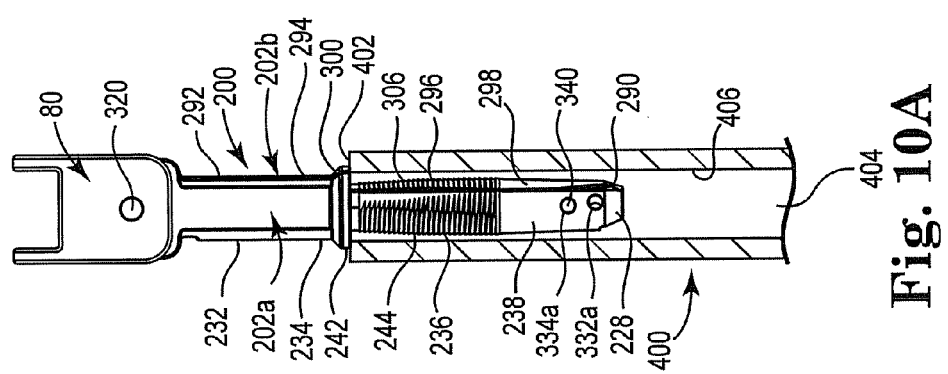
FIGS. 10A and 10B illustrate use of the pipe gripper device of FIG. 5 in pulling a pipe.

During use and with reference to FIG. 10A, the pipe gripper device 200 is arranged in the contracted state and partially inserted into a pipe 400. As a point of reference, FIG. 10A reflects the pipe 400 as being vertically oriented, terminating at an upper end 402. Vertically or near vertically (e.g., within 10° of true vertical) oriented pipes are encountered in many situations, including dewatering sites. The pipe gripper device 200 can be transitioned to the contracted state in a variety of manners, for example by the user manually transitioning the gripper bodies 202a, 202b to the contracted state. Where the pipe gripper device 200 is initially connected to, and hanging from, a strap or rope (not shown), a weight of the gripper bodies 202a, 202b will cause the pipe gripper device 200 to naturally assume the expanded state, thus necessitating manual movement of the gripper bodies 202a, 202b to the contracted state before insertion into the pipe 400 (e.g., the user grasping and drawing the intermediate segments 232, 292 toward one another). Alternatively, the user can grasp the strap or rope (not shown) extending from and above the clevis 80 and maneuver the leading ends 228, 290 into a bore 404 of the pipe 400, using an interior surface 406 of the pipe 400 to force the gripper device 200 to the contracted state. Regardless, partial insertion of the pipe gripper device 200 includes the grip segments 236, 296 being located within the bore 404 of the pipe 400, and the shoulders 242, 300 facing and resting against the upper end 402. The tapered insertion segments 238, 298 allow the pipe gripper device 200 to be more easily inserted into the bore 404.

Figure 10B:
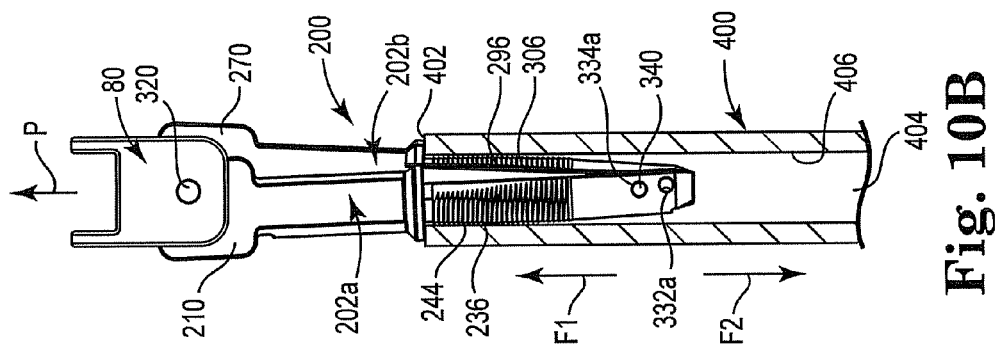

When the gripper device 200 is positioned such that the shoulders 242, 300 are resting on the upper end 402, the gripper device 200 will naturally assume the contracted state or position, fitting loosely in the bore 404. Only when the clevis 80 starts to move will the gripper device 200 start to expand and grip the pipe 400. Engagement between the pipe gripper device 200 and the interior surface 406 of the pipe 400 is achieved by transitioning the gripper bodies 202a, 202b toward the expanded state as shown in FIG. 10B. For example, a pulling force P applied to the clevis 80 in a direction opposite the pipe 400 (upwardly relative to the orientation of FIG. 10B) causes the pin 320 to slide within the slots 224a, 224b, 278 (FIG. 5). Movement of the pin 320 toward the corresponding second ends 226a, 226b, (FIG. 6B), 280 (FIG. 5) forces the heads 210, 270 in opposing directions, with the gripper bodies 202a, 202b pivoting relative to one another at the pivot point 340. Pivoting of the gripper bodies 202a, 202b continues until the grip segments 236, 296 engage the interior surface 406 (via the textured surfaces 244, 306). Continued application of the pulling force P in the same direction (or an increase in the pulling force P) effectively increases the level or force of engagement between the grip segments 236, 296 and the interior surface 406; as the pin 320 applies a continuous force onto the heads 210, 270, a continued force is thus applied by the grip segments 236, 296 onto the interior surface 406.

With the pipe gripper device 200 engaged with the interior surface 406 of the pipe 400, the pipe 400 can then be pulled as desired. The pulling force P can be generated in a variety of fashions, and in some embodiments is applied by a crane-mounted winch that is otherwise coupled to the clevis 80 (e.g., via a strap or rope (not shown)).

Once desired pulling of the pipe 400 is complete, the pipe gripper device 200 is disengaged from the pipe 400. For example, the pulling force P is removed and a user simply manually forces the gripper bodies 202a, 202b toward one another, thus transitioning the gripper device 200 toward the contracted state in which the gripper device 200 can be removed from the interior 406. Alternatively, where the pipe 400 remains vertically oriented following completion of the pipe pulling operation (e.g., such as where a long pipe is pulled from a dewatering site by a crane and is held vertically above ground), the disengagement or release can be accomplished by quickly applying an upward force F1 to the pipe 400 immediately followed by a downward force F2, as reflected by arrows in FIG. 10B. The upward force F1 is transferred from the pipe 400 onto the gripper bodies 202a, 202b via contact between the pipe end 402 and the stop segments 234, 294, and/or between the interior surface 406 and the grip segments 236, 296. Where the upward force F1 is greater than pulling force P being applied to the clevis 80, the gripper bodies 202a, 202b will temporarily move upwardly relative to the clevis assembly 204, with the pin 320 thus sliding within the slots 224a, 224b, 278 (FIG. 5) due to gravity. This action, in turn, forces the heads 210, 270 toward one another, thus pivoting the grip segments 236, 296 away from the interior surface 406 to thereby disengage the pipe gripper device 200 from the pipe 400. Subsequently, with quick removal of the upward force F1 and immediate application of the downward force F2, the pipe 400 will drop away from the pipe gripper device 200. Thus, rapid successive application of the upward and downward forces F1, F2 onto the pipe 400 (e.g., by a user grasping the pipe 400 at any location along a length thereof) causes the pipe 400 to disengage from the pipe gripper device 200. The pipe gripper device 20 of FIGS. 1A and 1B can be used in a manner consistent with the above explanations.

With embodiments in which the hinge assembly 206 (FIG. 5) is optionally configured to be user adjustable, a user can select a desired working size or dimension (e.g., diameter) of the gripper bodies 202a, 202b as a function of the pipe 400 to be pulled. For example, where the user determines that the pipe 400 has a relatively small inner diameter, the second hinge position is implicated and the user assembles the hinge pin 330 (FIG. 5) to the second bores 334a, 334b (the second bore 334b of the second gripper body 202b hidden in the views of FIGS. 10A and 10B) as shown in FIGS. 10A and 10B prior to use. Conversely, when the user determines that the pipe to be pulled has a relatively large inner diameter, the first hinge position is implicated and the user assembles the hinge pin 330 to the first bores 332a, 332b prior to use. In related alternative constructions, additional corresponding bores can be formed in the gripper bodies 202a, 202b that provide additional available working outer dimensions.

The pipe gripper device of the present disclosure, and related methods of use, provides a marked improvement over previous designs. The pipe gripper device disclosure is highly useful in pulling vertically oriented pipes such as those commonly found at dewatering sites. More particularly, when used with a vertically oriented pipe (or near vertical pipe), the pipe gripper device is easily insertable into the pipe, and naturally engages pipe immediately upon application of the pulling force. The pipe gripper device can be quickly released from the pipe as well. This technique is of great benefit where a lengthy pipe has been pulled using the pipe gripper device and the pipe gripper device/pipe interface is located at a high elevation at completion of the pulling process. Unlike prior art devices that otherwise require a user to directly handle the pipe gripper device to effectuate removal, the device and methods of the present disclosure allow the user to simply grasp the vertically oriented pipe at a convenient location and then apply quick upward and downward forces to cause desired disengagement.

Although the present disclosure has been described with reference to preferred embodiments, workers skilled in the art will recognize that changes can be made in form and detail without departing from the spirit and scope of the present disclosure. For example, the gripper bodies can incorporate other features differing from those described above that promote sliding engagement therebetween.

What is claimed is:

1. A pipe gripper device for selectively engaging an inner surface of a pipe for use in pulling a pipe, the pipe gripper device comprising:
first and second gripper bodies each defining an exterior and an interior, the gripper bodies each including:
a head forming a slot;
an elongated arm extending from the head and terminating at a leading end opposite the head, the arm defining a grip segment proximate the leading end and forming a textured surface along the exterior;
wherein the arms are pivotably coupled to one another at a pivot point adjacent the respective leading ends, and slidably contact one another along at least a portion of the corresponding interiors; and
a clevis assembly including a clevis mounted to the heads by a pin passing through the respective slots;
wherein the pipe gripper device is transitionable between a contracted state and an expanded state by pivoting of the gripper bodies relative to one another at the corresponding pivot points, the pin sliding within the corresponding slots to define a limit of the expanded state, and further wherein a maximum outer dimension collectively defined by the grip segments is greater in the expanded state than in the contracted state.

2. The pipe gripper device of claim 1, wherein each of the arms further includes an intermediate segment extending from the head and a stop segment located between the intermediate segment and the grip segment, the stop segment defining an increased outer dimension along the exterior as compared to that of the grip segment.

3. The pipe gripper device of claim 1, wherein each of the arms further includes an insertion segment between the grip segment and the leading end, the insertion segment defining a tapering outer dimension along the exterior side.

4. The pipe gripper device of claim 1, wherein the elongated arm of the first gripper body forms a channel, and the elongated arm of the second gripper body is slidably received within the channel.

5. The pipe gripper device of claim 4, wherein the head of the first gripper body forms a gap, and further wherein the head of the second gripper body is slidably received within the gap.

6. The pipe gripper device of claim 4, wherein the interior of the grip segment of the first gripper body includes:
a first surface; and
an opposing second surface spaced from the first surface to define the channel.

7. The pipe gripper device of claim 6, wherein the interior of the grip segment of the second gripper body includes opposing, first and second surfaces, and further wherein the first surface of the first gripper body slidably abuts the first surface of the second gripper body and the second surface of the first gripper body slidably abuts the second surface of the second gripper body.

8. The pipe gripper device of claim 1, further comprising a hinge assembly establishing the pivotable coupling between the elongated arms.

9. The pipe gripper device of claim 8, wherein the hinge assembly is configured to be adjustable.

10. The pipe gripper device of claim 9, wherein the hinge assembly includes:
a first bore formed in each of the elongated arms, respectively; and
a hinge pin removably disposed within each of the first bores;
wherein upon assembly of the hinge pin to the first bores, the hinge pin defines the pivot point.

11. The pipe gripper device of claim 9, wherein the hinge assembly further includes:
a second bore formed in each of the elongated arms, respectively, and sized to selectively receive the hinge pin;
wherein the second bore is offset from the corresponding first bore.

12. The pipe gripper device of claim 11, wherein coupling of the hinge pin to the first bores establishes a first hinge position of the pipe gripper device, and coupling of the hinge pin to the second bores establishes a second hinge position, and further wherein relative to the contracted state, the maximum outer dimension collectively defined by the grip segments in the first hinge position is greater than a maximum outer dimension collectively defined by the grip segments in the second hinge position.

13. The pipe gripper device of claim 1, wherein upon final assembly, centerlines of the slots are non-colinear.

14. The pipe gripper device of claim 1, further including a square perimeter bearing rotatably assembled over the pin.

15. The method of pulling a pipe at least partially disposed underground, the method comprising:
  transitioning a pipe gripper device to a contracted state, the pipe gripper device comprising:
    first and second gripper bodies each defining an exterior and an interior, the gripper bodies each including:
      a head forming a slot,
      an elongated arm extending from the head and terminating at a leading end opposite the head, the arm defining a grip segment proximate the leading end and forming a textured surface along the exterior,
    wherein the arms are pivotably coupled to one another at a pivot point adjacent the respective leading ends, and slidably contact one another along at least a portion of the corresponding interiors,
    a clevis assembly including a clevis mounted to the heads by a pin passing through the respective slots,
    wherein the gripper device is transitionable between the contracted state and an expanded state by pivoting of the gripper bodies relative to one another at the corresponding pivot point, the pin sliding within the corresponding slots to define a limit of the expanded state, and further wherein a maximum outer dimension collectively defined by the grip segments is greater in the expanded state than in the contracted state;
  inserting the grip segments into an end of the pipe;
  transitioning the pipe gripper device toward the expanded state such that the grip segments engage an interior surface of the pipe; and
  applying a pulling force onto the pipe gripper device to pull the pipe from underground.

16. The method of claim 15, further comprising connecting the clevis assembly to a winch, wherein applying a pulling force includes operating the winch.

17. The method of claim 15, further comprising:
  releasing the pipe gripper device from the pipe.

18. The method of claim 17, wherein the step of releasing the pipe gripper device includes applying a pushing force onto the pipe in a direction of the pipe gripper device immediately followed by applying a pulling force onto the pipe in a direction opposite the pipe gripper device.

19. The method of claim 15, further comprising:
  evaluating a diameter of the pipe; and
  arranging the pipe gripper device in one of a first hinge position and a second hinge position based upon the evaluation prior to inserting the grip segments into the pipe, wherein a working outer dimension collectively defined by the grip segments differs between the first and second hinge positions.

20. The method of claim 15, wherein the method is performed on a near vertical pipe.

* * * * *